United States Patent
Tseng

(10) Patent No.: US 8,632,335 B2
(45) Date of Patent: Jan. 21, 2014

(54) INJECTION MOLDING APPARATUS WITH HEAT INSULATION ASSEMBLY

(75) Inventor: Min-Tsang Tseng, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 53 days.

(21) Appl. No.: 13/490,477

(22) Filed: Jun. 7, 2012

(65) Prior Publication Data

US 2013/0168900 A1  Jul. 4, 2013

(30) Foreign Application Priority Data

Dec. 29, 2011  (TW) .................................. 100149479

(51) Int. Cl.
 *B29C 45/73* (2006.01)
(52) U.S. Cl.
 USPC ........................ 425/547; 264/328.16; 425/548
(58) Field of Classification Search
 USPC ................................ 425/547, 548; 264/328.16
 See application file for complete search history.

(56) References Cited

U.S. PATENT DOCUMENTS

| | | | | |
|---|---|---|---|---|
| 2,883,704 | A * | 4/1959 | Jurgeleit | 425/547 |
| 4,615,669 | A * | 10/1986 | Fujita et al. | 425/547 |
| 2005/0064061 | A1 * | 3/2005 | Eichlseder | 425/548 |
| 2007/0092595 | A1 * | 4/2007 | Yoshino et al. | 425/547 |
| 2009/0232930 | A1 * | 9/2009 | Suzuki et al. | 425/547 |

* cited by examiner

*Primary Examiner* — Tim Heitbrink
(74) *Attorney, Agent, or Firm* — Altis Law Group, Inc.

(57) ABSTRACT

An injection molding apparatus includes an injecting device, a platform, a mold, and two heat insulation assemblies. The injecting device melts plastic and injects molten plastic into the mold. The platform loads and controls the mold and the injecting device. Each of the heat insulation assemblies includes a metallic plate and a pipe member. The pipe member is mounted in the metallic plate for receiving hot liquid to heat the metallic plate. The mold is sandwiched between two metallic plates of the two heat insulation assemblies. One of the metallic plates is mounted between the mold and the injecting device. The other metallic plate is mounted between the mold and the platform.

12 Claims, 3 Drawing Sheets ially to the first surface 211 and a second surface 212

INJECTION MOLDING APPARATUS WITH HEAT INSULATION ASSEMBLY

BACKGROUND

1. Technical Field

The present disclosure relates to injection molding apparatuses and, particularly, to an injection molding apparatus with two heat insulation assemblies.

2. Description of Related Art

Injection molding apparatuses usually include an injecting device, a platform, and a mold. The injecting device and the mold are mounted on the platform. In operation, the injecting device heats and melts plastic particles and injects the molten plastic into the mold. The mold is also heated and maintained at a high temperature to obtain a high quality of products. However, electronic elements arranged in the platform, which is employed for controlling the injecting device and the mold, may be adjacent to the mold and cannot withstand such high temperatures. In addition, it is desirable not to transfer the heat of the mold to other elements, as the loss of heat would cause the mold to cool down quickly and create many defects, such as roughness, in the finished products. As such, a heat insulation plate made of glass fiber is employed and positioned between the mold and the platform to prevent the mold from transferring the heat to the platform. However, such heat insulation plate can only slow the falling speed of the temperature of the mold. The mold still unavoidably cools down. Accordingly, the defects of the products may not be avoided.

Therefore, it is desirable to provide an injection molding apparatus which can overcome the above-mentioned problems.

DETAILED DESCRIPTION

Figure 1:
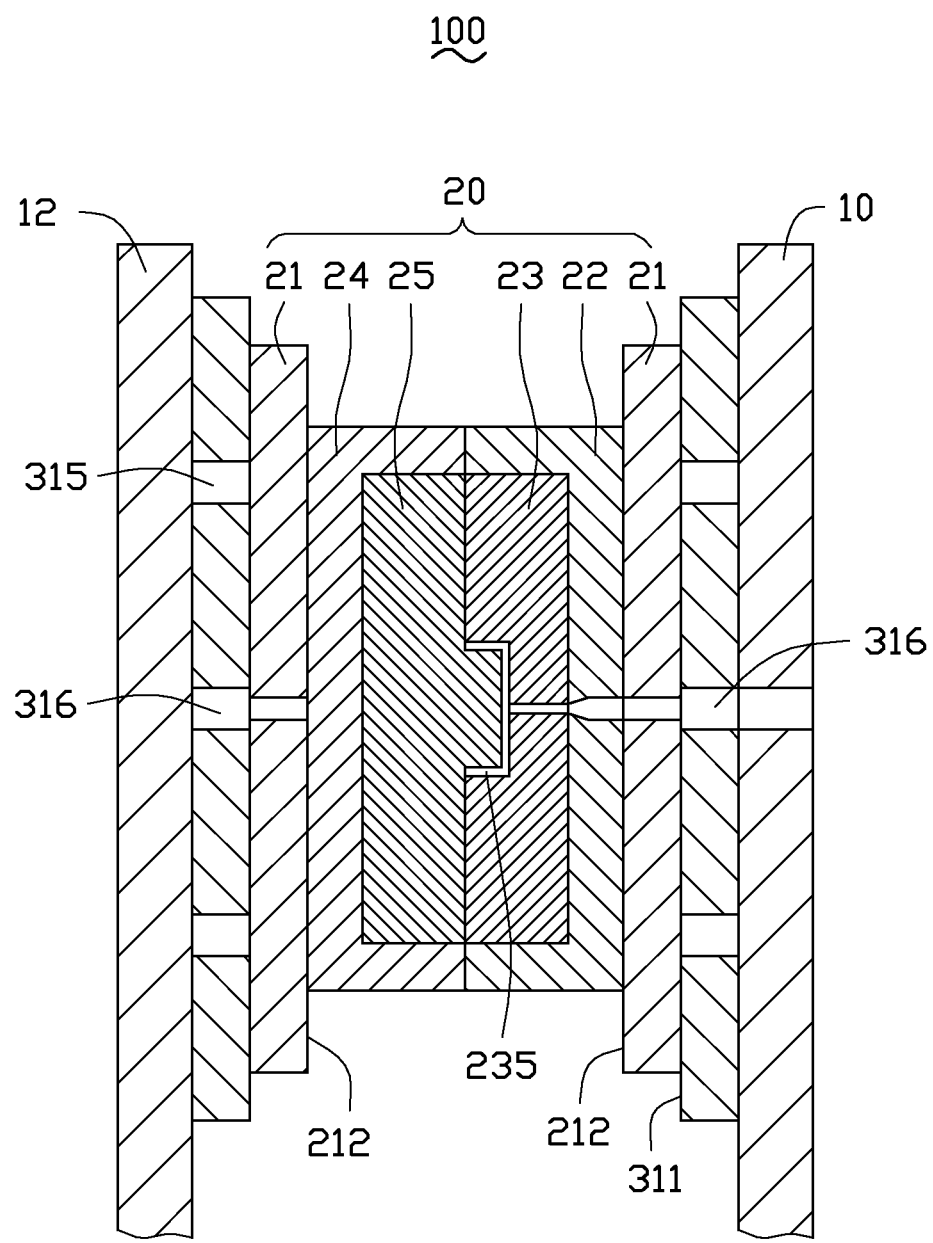
FIG. 1 is a cross-sectional schematic view of an injection molding apparatus, according to an exemplary embodiment.
Figure 2:
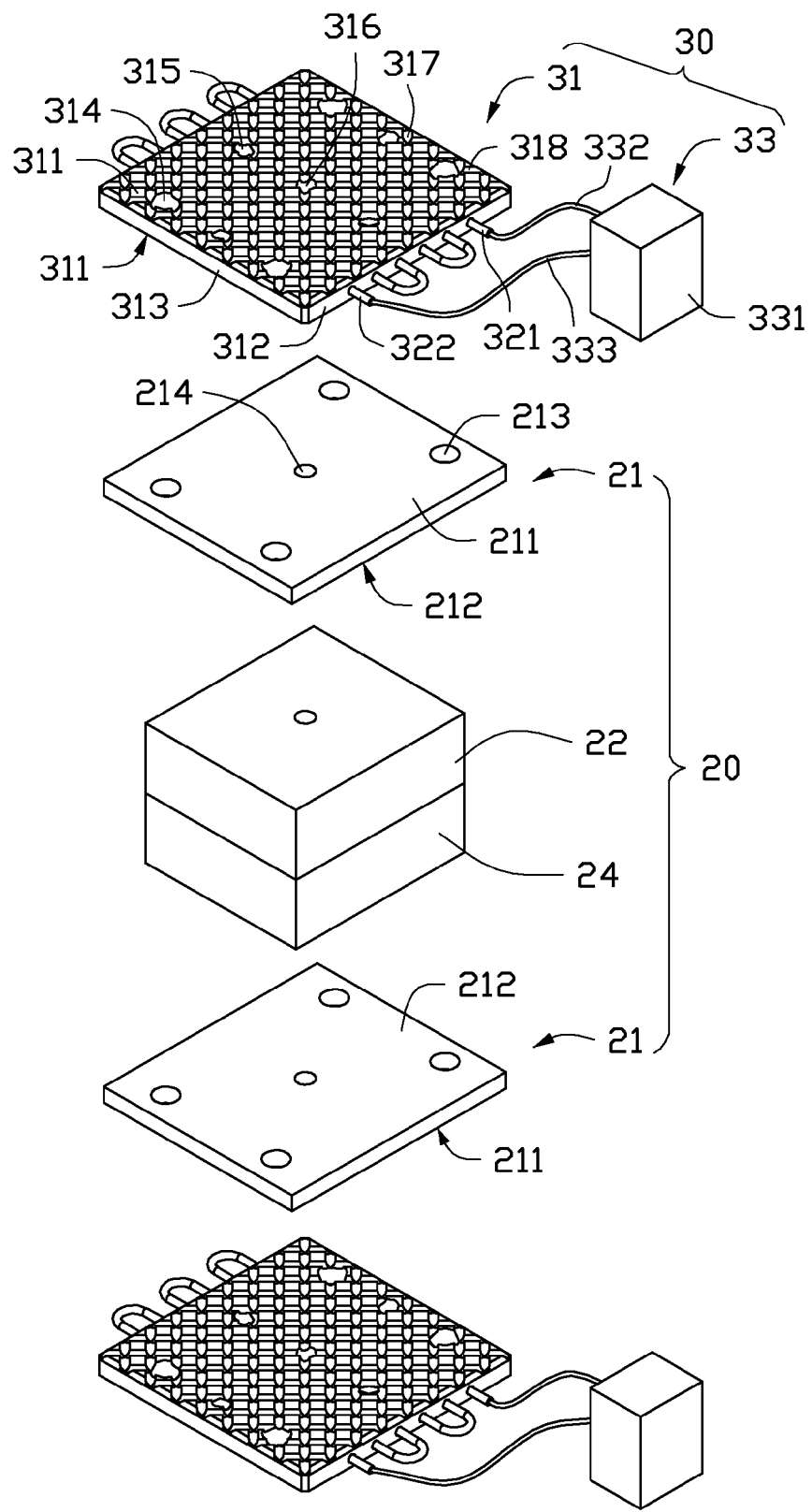
FIG. 2 is an exploded schematic view of a mold and two heat insulation assemblies of the injecting molding apparatus of FIG. 1.

FIGS. 1 and 2, show an injection molding apparatus 100, according to an exemplary embodiment. The injection molding apparatus 100 includes an injecting device 10, a platform 12, a mold 20, and two heat insulation assemblies 30.

The injecting device 10 is used to heat and melt plastic particles and inject the molten plastic into the mold 20.

The platform 12 is used to provide various mechanical and functional supports for the injecting device 10 and the mold 20. A number of electronic elements are included in the platform 12. In this embodiment, the electronic elements are used to control the injecting device 10 and the mold 20.

The mold 20 includes two mounting plates 21, a female die body 22, a female die core 23, a male die body 24, and a male die core 25. Each mounting plate 21 is generally rectangular and includes a first surface 211 and a second surface 212 opposite to the first surface 211. Each mounting plate 21 defines four mounting holes 213 and a first center hole 214 passing through the first surface 211 and the second surface 212. The four mounting holes 213 are generally distributed at four corners of each mounting plate 21. The first center hole 214 is generally in the center of each mounting plate 21. The female die body 22 is mounted onto the second surface 212 of one of the mounting plates 21. The female die core 23 is accommodated in the female die body 22. The male die body 24 is mounted onto the second surface 212 of the other mounting plate 21. The male die core 25 is accommodated in the male die body 24. The female die core 23 and the male die core 25 cooperatively form a mold cavity 235 for forming plastic products.

Figure 3:
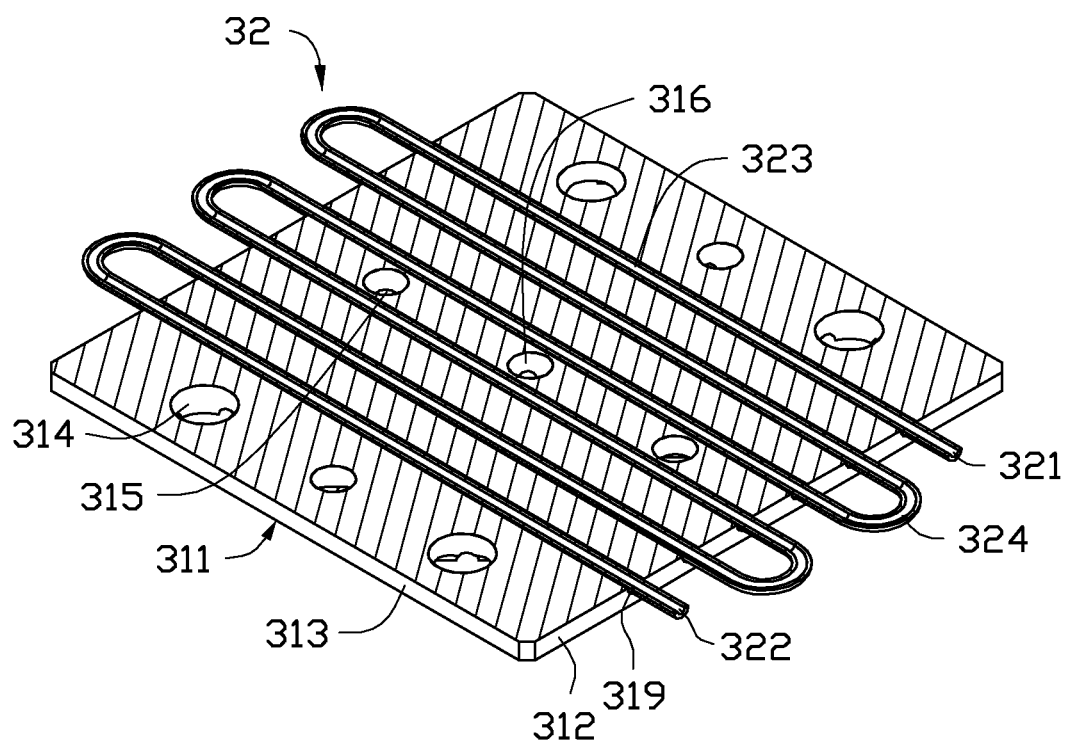
FIG. 3 is a cutaway view of a metallic plate of one of the heat insulation assemblies of FIG. 2.

Referring to FIGS. 2-3, each heat insulation assembly 30 includes a metallic plate 31, a pipe member 32, and a heat source 33.

The metallic plate 31 is made of steel and generally rectangular. The metallic plate 31 includes a pair of contact surfaces 311 opposite to each other, a pair of first side surfaces 312, and a pair of second side surfaces 313. The first side surfaces 312 and the second side surfaces 313 perpendicularly connect between the contact surfaces 311. The metallic plate 31 defines four assembling holes 314, four fixing holes 315, and a second center hole 316. All of the assembling holes 314, the fixing holes 315, and the second center hole 316 pass through the pair of contact surfaces 311.

The four assembling holes 314 are generally distributed at four corners of the metallic plate 31. Each of the assembling holes 314 corresponds to a respective one of the mounting holes 213 of each mounting plate 21. Each metallic plate 31 is mounted onto the first surface 211 of a corresponding mounting plate 21 with a screw being mounted in an assembling hole 314 and a corresponding mounting hole 213. Each fixing hole 315 is positioned between two assembling holes 314 and is used to receive a screw or a bolt such that two metallic plates 31 of the two heat insulation assemblies 30 can respectively be fixed to the injecting device 10 and the platform 12. In this embodiment, one of the metallic plates 31 is fixed to the injecting device 10 with the pair of contact surfaces 311 respectively attaching to the injecting device 10 and one of the mounting plates 21, the other metallic plate 31 is fixed to the platform 12 with the pair of contact surfaces 311 respectively attaching to the platform 12 and the other mounting plate 21. The second center hole 316 is generally in the center of each metallic plate 31 and corresponds to the first center hole 214 of each mounting plate 21. The second center hole 316 of the metallic plate 31 mounted on the injecting device 10 communicates with the mold cavity 235.

Each of the contact surfaces 311 defines a plurality of first grooves 317 and second grooves 318. The first grooves 317 are uniformly distributed and parallel to each other. The second grooves 318 are uniformly distributed and parallel to each other. The first grooves 317 are substantially perpendicular to the second grooves 318. The metallic plate 31 further defines a number of through holes 319 perpendicularly passing through the pair of first side surfaces 312 and embedded in the metallic plate 31. The through holes 319 are uniformly distributed on the first side surfaces 312 and parallel to each other and the second side surfaces 313. The through holes 319 are separated from the first grooves 317 and the second grooves 318.

The pipe member 32 is made of tubular metal. In alternative embodiments, the pipe member 32 can be made of high temperature resistant plastic or resin. The pipe member 32 includes an inlet port 321 and an outlet port 322. Each pipe member 32 is deformed to form a plurality of straight sections 323 and a plurality of bent sections 324. The straight sections 323 are parallel to and align with each other. The pipe member 32 is partially received in the through holes 319. In detail, each straight section 323 is received in a corresponding through hole 319. Each bent section 324 is generally U-shaped. Two neighbored straight sections 323 are connected and in communication with each other through a bent section 324. The inlet port 321 extends from one end of a straight section 323 adjacent to one of the second side surfaces 313. The outlet port 322 extends from one end of another straight section 323 adjacent to the other second side surface 313.

The heat source 33 includes a heating device 331, a tubular output end 332, and a tubular input end 333. The heating device 331 heats liquid such as oil or water to a predetermined temperature. The liquid can be oil or water. In this embodiment, the liquid is oil. The output end 332 is connected between the heating device 331 and the inlet port 321 of the pipe member 32. The output end 332 outputs the hot liquid to the pipe member 32 to heat the metallic plate 31. The input end 333 is connected between the outlet port 322 of the pipe member 32 and the heating device 331. The hot liquid in the pipe member 32 transfers heat to the metallic plate 31 such that the hot liquid is cooled down. The cooled-down liquid is transferred to the heating device 331 through the input end 333 to be reheated to the predetermined temperature.

In use, the mold 20 is heated to a preset temperature by heating elements (not shown), for example by resistance heating elements arranged in the female die body 22 and/or in the male die body 24. In one example, the preset temperature is about 200 degrees centigrade. The injecting device 10 melts plastic and injects molten plastic into the mold cavity 235. The heating device 331 heats the oil to the predetermined temperature. In this embodiment, the predetermined temperature is less than the preset temperature and, for example, the predetermined temperature is about 100 degrees centigrade. The hot oil is transferred to the pipe members 32. The straight sections 323 of each pipe member 32 heat the metallic plate 31 to the predetermined temperature.

The mold 20 is sandwiched between the two metallic plates 31 of the two heat insulation assemblies 30. One of the metallic plates 31 is mounted between the mold 20 and the injecting device 10. The other metallic plate 31 is mounted between the mold 20 and the platform 12. The metallic plate 31 mounted between the mold 20 and the platform 12 can prevent the mold 20 from transferring heat to the platform 12 and achieve heat insulation function. On the other hand, each metallic plate 31 can be maintained at a constant temperature by a corresponding heat source 33. Therefore, it is able to prevent the mold 20 from dissipating heat through the metallic plates 31 and keep the mold 20 substantially at a constant temperature.

In this embodiment, because the contact surfaces 311 of each metallic plate 31 define the first grooves 317 and the second grooves 318, contact areas between the mold 20 and each metallic plate 31, between the injecting device 10 and a corresponding metallic plate 31, and between the platform 12 and the other metallic plate 31 can be reduced. Therefore, it reduces heat transferring from the mold 20 to the two metallic plates 31, from a corresponding metallic plate 31 to the injecting device 10, and from the other metallic plate 31 to the platform 12.

In alternative embodiments, the two heat insulation assemblies 30 can only include one heat source 33. Two pipe members 32 of the two heat insulation assemblies 30 are provide with hot liquid by the one heat source 33.

The above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. An injection molding apparatus, comprising:
   a mold;
   an injecting device for melting plastic and injecting molten plastic into the mold;
   a platform for loading and controlling the mold and the injecting device; and
   two heat insulation assemblies, each of the heat insulation assemblies comprising:
      a metallic plate; and
      a pipe member mounted in the metallic plate for receiving hot liquid to heat the metallic plate;
   wherein the mold is sandwiched between and mounted to the two metallic plates of the two heat insulation assemblies, one of the metallic plates is mounted to and sandwiched between the mold and the injecting device, the other metallic plate is mounted to and sandwiched between the mold and the platform, and the metallic plates are heated by the hot liquid to a predetermined temperature lower than a preset temperature of the mold to prevent the mold from transferring heat to the injecting device and the platform.

2. The injection molding apparatus of claim 1, wherein each of the heat insulation assemblies further comprises a heat source connected to the pipe member for providing the hot liquid.

3. The injection molding apparatus of claim 2, wherein the metallic plate comprises a pair of contact surfaces, each of the contact surfaces defines a plurality of first grooves and a plurality of second grooves, the pair of contact surfaces of one of the metallic plates are respectively attached to the injecting device and the mold, and the pair of contact surfaces of the other metallic plate are respectively attached to the platform and the mold.

4. The injection molding apparatus of claim 3, wherein the first grooves are uniformly distributed on each contact surface and parallel to each other, the second grooves are uniformly distributed on each contact surface and parallel to each other; and the first grooves are substantially perpendicular to the second grooves.

5. The injection molding apparatus of claim 3, wherein the metallic plate further comprises a pair of first side surfaces perpendicularly connecting between the contact surfaces, the metallic plate further defines a plurality of through holes passing through the pair of first side surfaces, and the pipe member is partially received in the through holes.

6. The injection molding apparatus of claim 5, wherein the metallic plate further comprises a pair of second side surface perpendicularly connect between the contact surfaces, and the through holes are uniformly distributed on the first surfaces and parallel to each other and the second side surfaces.

7. The injection molding apparatus of claim 6, wherein the pipe member is tubular and comprises an inlet port and an outlet port, the inlet port and the outlet port are connected to the heat source, the pipe member is deformed to form a plurality of straight sections and a plurality of bent sections, the straight sections are parallel to and align with each other, each straight section is received in a corresponding one of the through holes, each bent section is U-shaped, and two neighbored straight sections are connected and in communication with each other through a respective one of the bending sections.

8. The injection molding apparatus of claim 7, wherein the inlet port extends from one end of a straight section adjacent to one of the second side surfaces, and the outlet port extends from one end of another straight section adjacent to the other second side surface.

9. The injection molding apparatus of claim 8, wherein the heat source comprises a heating device, a tubular input end, and a tubular output end, the output end is connected between the heating device and the inlet port of the pipe member, and the input end is connected between the outlet port of the pipe member and the heating device.

10. The injection molding apparatus of claim 8, wherein the pipe member is made of high temperature resistance plastic.

11. An injection molding apparatus, comprising:
   an injecting device for melting plastic and injecting molten plastic into a mold;
   a platform for loading and controlling the mold and the injecting device; and
   two heat insulation assemblies, each of the heat insulation assemblies comprising:
      a metallic plate; and
      a pipe member mounted in the metallic plate for receiving hot liquid to heat the metallic plate;
   wherein the metallic plate of one of the heat insulation assemblies is mounted on the injecting device, the metallic plate of the other heat insulation assembly is mounted on the platform, the mold is sandwiched between and mounted to two metallic plates of the two heat insulation assemblies when the mold is used, and the metallic plates are heated by the hot liquid to a predetermined temperature lower than a preset temperature of the mold to prevent the mold from transferring heat to the injecting device and the platform.

12. The injection molding apparatus of claim 1, wherein each of the heat insulation assemblies further comprises a heat source for providing the hot liquid to the pipe member.

* * * * *